(12) United States Patent
Tran

(10) Patent No.: US 10,471,313 B2
(45) Date of Patent: Nov. 12, 2019

(54) COLLAPSIBLE THREE-WHEELED ALL-IN-ONE GOLF PUSH CART

(71) Applicant: Thinh Quang Tran, Elk Grove, CA (US)

(72) Inventor: Thinh Quang Tran, Elk Grove, CA (US)

( * ) Notice: Subject to any disclaimer, the term of this patent is extended or adjusted under 35 U.S.C. 154(b) by 0 days.

(21) Appl. No.: 14/857,836

(22) Filed: Sep. 18, 2015

(65) Prior Publication Data

US 2016/0303442 A1 Oct. 20, 2016

Related U.S. Application Data

(63) Continuation-in-part of application No. 14/336,094, filed on Jul. 21, 2014, now Pat. No. 9,162,695.

(Continued)

(51) Int. Cl.
*B60K 28/06* (2006.01)
*A63B 55/30* (2015.01)
*B62B 5/04* (2006.01)
*B62B 3/02* (2006.01)
*B62B 3/10* (2006.01)
*A63B 55/40* (2015.01)

(Continued)

(52) U.S. Cl.
CPC ............ *A63B 55/30* (2015.10); *A63B 55/40* (2015.10); *B60K 28/06* (2013.01); *B62B 3/02* (2013.01); *B62B 3/102* (2013.01); *B62B 5/0447* (2013.01); *A63B 55/20* (2015.10); *A63B 55/408* (2015.10); *A63B 55/57* (2015.10); *A63B 57/203* (2015.10); *A63B 2055/602* (2015.10); *A63B 2071/0063* (2013.01); *A63B 2209/08* (2013.01); *A63B 2210/50* (2013.01); *A63B 2225/68* (2013.01); *A63B 2225/682* (2013.01)

(58) Field of Classification Search
CPC .... B62B 1/14; B62B 3/02; B62B 1/12; B62B 5/067; B62B 1/18; B62B 3/10; B62B 1/20; B62B 1/26; B62B 1/008; B62B 3/005; B62B 3/104; B62B 1/002; B62B 1/10; B62B 1/125; B62B 1/264; B62B 2202/028; B62B 5/00
See application file for complete search history.

(56) References Cited

U.S. PATENT DOCUMENTS

2013/0234420 A1* 9/2013 Reimers ................ A63B 55/08
280/651

* cited by examiner

*Primary Examiner* — James A Shriver, II
*Assistant Examiner* — James J Triggs
(74) *Attorney, Agent, or Firm* — O'Banion & Ritchey LLP; John P. O'Banion

(57) ABSTRACT

A three-wheeled golf pushcart that combines the usage and benefits of a conventional pushcart and golf bag into a single piece of equipment. The cart comprises a collapsible three wheeled configuration and push bar. These collapsible mechanisms enable the cart to be transformed into two positions: folded or extended. The cart is also equipped with a plurality of golf club slots strategically formed into a V-shaped. In addition to the caddy console and accessories tray, removable storage compartments are also added to the perimeter of the cart's body for additional storage room. In an extended position, the cart is designed to be used for walking similar to using a "pushcart and bag combination". In a folded position, the cart is compact and designed to fit securely onto the back of a motorized cart for riding, similar to a conventional golf bag. This compact folded position also makes it ideal for handling and stowing.

19 Claims, 16 Drawing Sheets

Related U.S. Application Data

(60) Provisional application No. 61/958,327, filed on Jul. 24, 2013.

(51) Int. Cl.
*A63B 55/57* (2015.01)
*A63B 55/60* (2015.01)
*A63B 71/00* (2006.01)
*A63B 55/00* (2015.01)
*A63B 57/20* (2015.01)
*A63B 55/20* (2015.01)

COLLAPSIBLE THREE-WHEELED ALL-IN-ONE GOLF PUSH CART

This is a Continuation-in-Part application claiming priority benefit to an allowed application Ser. No. 14/336,094 filed in the United States Patent and Trademark Office by the same inventor on 21 Jul. 2014.

BACKGROUND OF THE INVENTION

A) Field of Invention

The game of golf generally involves the golf course, the golfer, and the golf equipment. My invention pertains to the golf equipment, particularly for transportation of the golf clubs and golf related items on the golf course.

Today, golf clubs are being transported on the golf course by golf bags. These golf bags generally come with either hand and/or shoulder straps. Golfers who choose not to manually carry their golf bags by hand or over the shoulder are limited to a few alternatives below:
1) Strap the golf bag to a conventional wheeled push or pull cart.
2) Strap the golf bag to the back of a motorized riding cart.
3) Hire a caddy to carry the golf bag. This option, unfortunately, is very limited since most public golf courses do not have personal caddy services.

Riding a motorized cart is a popular choice for many golfers. For those that enjoy walking the course, using a conventional pushcart is the more practical and wise choice. Carts have been mentioned in literature as far back as the second millennium B.C. Hand-carts pushed by humans have been used around the world. In the 19th century, for instance, some Mormons travelling across the plains of the United States between 1856 and 1860 used handcarts (Source: Wikipedia, History of Carts). When the two-wheeled pull cart was first introduced to the game, some 60 years ago, it wasn't very well received. It was perceived as being lazy or less "manly", especially when golf was not considered as a "sport" by the non-golfing general public.

It wasn't until the late 1990s when the three-wheeled golf cart was invented and made popular. Today, walking the course is common and gaining more popularity. Collegian golfers in recent years have also been spotted using golf pushcarts in their school major championship tournaments. With all the golf clubs and golf related items, a fully loaded golf bag can take its toll on the golfer's body during the round. For this reason, many golfers would choose to let the pushcart do the hard work so that he/she could have more energy to concentrate on the game itself. The choice to use the golf pushcart, however, comes with many disadvantages and inconveniences. Storage is the biggest hassle. Keeping a pushcart in the trunk is an inconvenience as it leaves little room for additional storage space. It is nearly impossible to fit four sets of cart and bag combinations into the trunk of a standard midsize car. This is problematic when it comes to carpooling. Over the years, modern pushcarts have been innovatively redesigned to fold into smaller configurations, nonetheless, no matter how small it is still an additional piece of equipment that takes up valuable storage space. Current golf bags, despite endless innovations and improvements, still have their flaws when it comes to using them on the riding cart. They don't stay put after getting strapped down on to the riding cart. As a result, golfers often have to take the extra time to adjust the strapped bag from twisting or falling out of place within the designated stowing parameter of the riding cart. From the constant rattling and twisting of the bag during the ride, many golf bags will break since they are not designed to withstand such abuse.

Another disadvantage is the lost of time. Assembling and disassembling the extra pieces of equipment before and after the round is very time consuming. A golfer must first set the cart from a folded to extended position; then proceed to taking the steps necessary to make sure the bag is properly and securely fastened into the extended cart. After the round of golf, the golfer needs to reverse this time consuming process all over again, prior to stowing the two cumbersome pieces of equipment. These disadvantages and inconveniences often steer golfers away from walking the course altogether. Having personally experiencing these hassles myself, I was inspired to invent a golf cart that would stand up to the test and enable golfers to walk or ride with a single, user friendly, piece of equipment. An all-in-one golf cart is the answer. In a folded position, the cart is comparable to the size of a conventional golf bag. It is designed to fit securely behind a motorized riding cart better than a golf bag without having to disassemble any structural components. In an extended position, the cart will operate similar to a golf bag strapped onto a wheeled pushcart.

The overall objective of my present invention is to provide a practical and convenient alternative to the traditional method of using a conventional "golf bag and pushcart combination". In addition, using the all-in-one golf cart has many advantages compared to the perceived traditional way of transporting golf equipment during a round of golf.

B) Objectives and Advantages of the Present Invention 1. (Objective) is to design a cart that has collapsible mechanism that can be transformed into a folded or extended position in very few and simple operational steps.
2. (Objective) is to provide the cart with braking capability, which allows the golfer to set the cart in park as needed when used for walking during the round.
3. (Objective) is to design a cart, at folded position, fits securely on any standard motorized riding cart better than a conventional golf bag.
4. (Objective) is to save storage space by having just one piece of equipment that does both jobs.
5. (Objective) is to provide a walking cart that will fit golfers with various heights through the use of an adjustable push bar assembly.
6. (Objective) is to design a cart with little or no compromise compared to the conventional golf pushcart and bag's combined benefits.
7. (Advantage) is, at an extended position, the broad wheelbase created by the three wheels provides excellent stability when rolling around the unpredictable golf course's terrains.
8. (Advantage) is with the three wheel design, the cart is self-stabled thus making it easy to maneuver and saves energy. This stability also allows the cart to run on its own with forward momentum or going down the slopes on the golf course
9. (Advantage) is that the rotational axis of three wheels are always parallel to each other, making it easy to fold and extend the cart. This parallel alignment of the rotational axis also allow the cart to roll in a straight line during walking mode.
10. (Advantage) is that the multi-lightweight material construction such as aluminum and plastic results in a sturdy, yet lightweight cart, which can be easily handled by any average golfer.

11. (Advantage) is that the design and arrangement of the golf club slots on the cart will make it easy for the golfer to easily keep track of the clubs while playing the game. Each club holding slot is design to hold one club, great for club protection and keeping clubs organized.

12. (Advantage) is allowing the golfer to have convenient access to the three of the most used golf clubs in a round of golf: the putter and wedges. The three slots, also referred to as center club slots, are located in the middle of the cart, positioned away from the rest of the perimeter golf club slots.

13. (Advantage) is having the removable storage compartments for cleaning and washing. Different bag colors and style options will also be available for customized personalization 14. (Advantage) is having integrated handles 360 degrees around the top perimeter of the cart for easily accessibility.

15. (Advantage) is economical by saving money on buying an extra push cart or renting one at the golf course. In conclusion, with innovative designs and easy to operate collapsible mechanisms, the object of my invention is to provide an effective and practical alternative for transporting golf equipment during a round of golf, eliminating the hassle of juggling extra pieces of equipment.

C) Background and Description of Prior Art

Over the years, golf bag designs have continued to evolve. They are available in smaller and lighter sizes. Some golfers, however, still prefer the oversized cart bag for its storage capacity. The miles during a round of golf (source: Ask-.com). To cover this distance, a golfer will either have to carry the golf bag by hand or over the shoulder; or rely on other assisted means such as a wheeled pushcart or motorized riding cart. As mentioned, golf bags themselves have been redesigned to be lighter and smaller. However, with the golf clubs and golf-related items added, it will become heavy and cumbersome to haul around. In attempting to solve this problem with the golf bag, wheeled golf bags have also been, as seen in U.S. Pat. No. 6,554,299 B1 and US U.S. Pat. No. 7,114,730 B2. However, these bag designs only have two wheels. The disadvantage of using a two-wheeled golf bag or cart is apparent. It is not self-stabled. The golfer has to maintain its balance at all times when it is in use, similar to handling a wheeled travel luggage. This is the major reason why a three-wheeled pushcart, such as U.S. Pat. No. 8,191,920 B2 is more preferred over a two-wheeled pullcart as seen in U.S. Pat. No. 3,820,617 A. The design of a three-wheeled pushcart has also evolved and improved over the years. Nonetheless, regardless of their size and weight, the main disadvantage of these carts is storage. It is an additional piece of equipment that takes up valuable storage space. From personal experience, when carpooling with my playing With an increasingly competitive pushcart market, cart companies continue to push the envelope for even more compact and lighter carts, such as U.S. Pat. No. 8,544,871 B1, which essentially folds disadvantage of these carts is, ironically, their existence.

Recent inventions with three or four-wheeled golf bag & cart combination have also been introduced to the market. As seen in U.S. Pat. No. 8,408,562 B1, this design aimed to solve the above-mentioned challenges of the uses of a "cart and bag combination" by combining the golf bag with collapsible push bar and wheels. However, this current invention will not fit onto the back of a motorized riding cart without the inconvenience of disassembling major parts such as wheels and related structural components of the cart.

SUMMARY OF INVENTION

By combining the major benefits of using a traditional golf bag and the functionality of a three-wheeled pushcart into an ALL-IN-ONE CART, the objective of my invention is to provide a practical and smart alternative to the use of a conventional golf bag and cart combination when playing the game of golf.

In summary, the cart comprises three wheels, a tri-tier chassis body, and a push bar assembly.

The cart is designed to be folded into two positions, folded for storage & riding and extended for walking.

Through the use of the axles and mounts, the two rear wheels are installed onto the trailing arms, which are then installed onto the lower chassis mount. The front wheel is installed onto the front fork, which is attached to the lower chassis. This lower chassis is fastened to the center chassis. The center chassis is then fastened to the upper chassis. The push bar assembly is attached to the upper chassis through the use of a clamp mount. A caddy console is mounted onto the push bar for storing golf-related and personal items. An accessories tray is also installed onto the upper chassis for storing additional golfer's belongings. The cart is also equipped with a handbrake assembly for parking the cart during walking mode. In addition to the two storage trays, the cart is equipped with a body wrap. The body wrap has snap buttons that allow multiple storage compartments to be attached. These storage components are designed to be easily removable for cleaning and color/style personalization.

BRIEF DESCRIPTION OF THE DRAWING FIGURES

The present invention will now be conceptually illustrated through the following drawings in which.

DETAILED DESCRIPTIONS OF THE PREFERRED EMBODIMENTS

Figure 1:
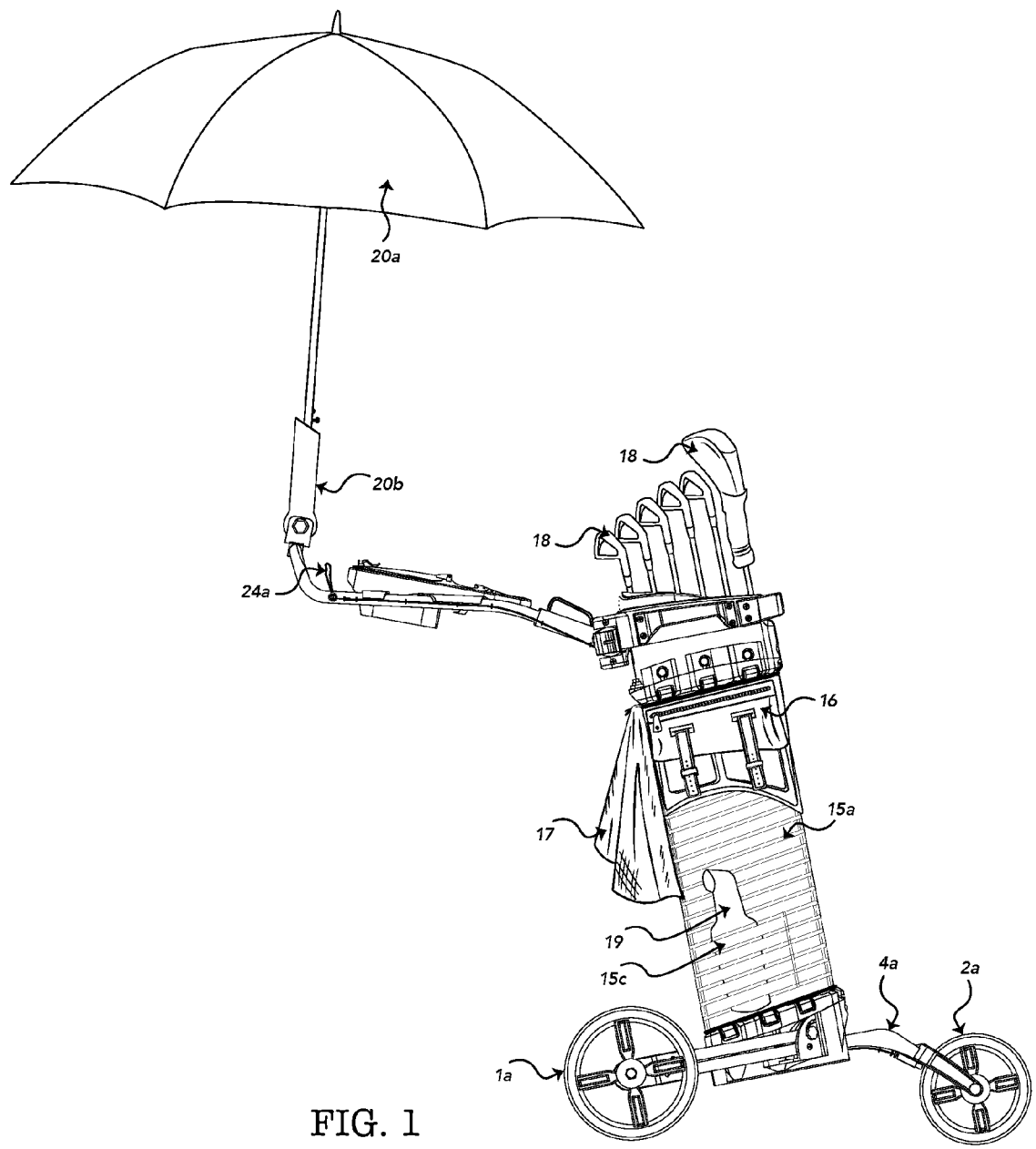
FIG. 1 shows a side view of the cart, in an extended position, fully assembled with accessories and a few golf clubs added.

A cart shown in FIG. 1 comprises nine major structural components.

Figure 3:
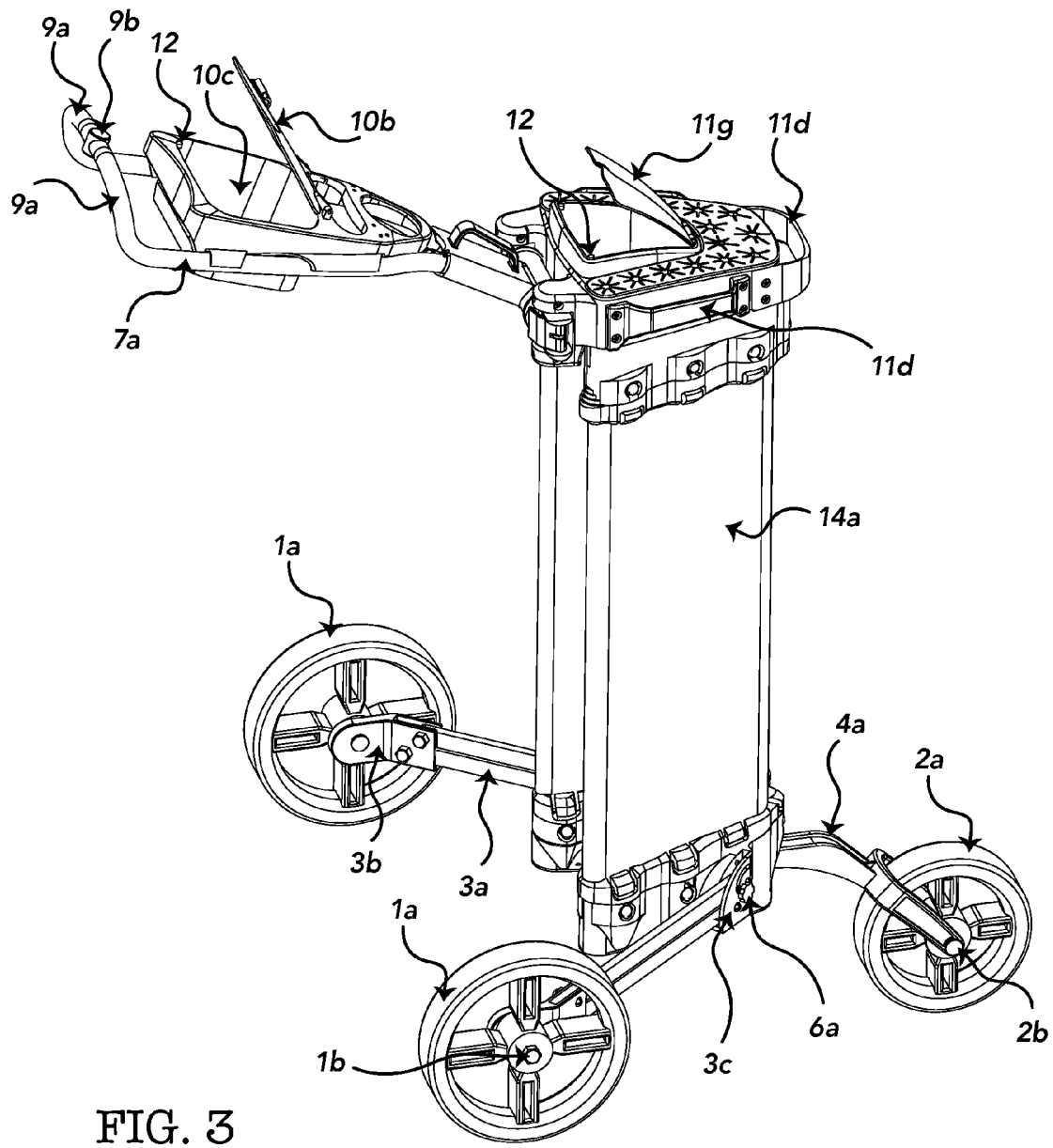
FIG. 3 shows a side perspective view of the cart in extended mode for walking (golf clubs and accessories are not shown)
Figure 9:
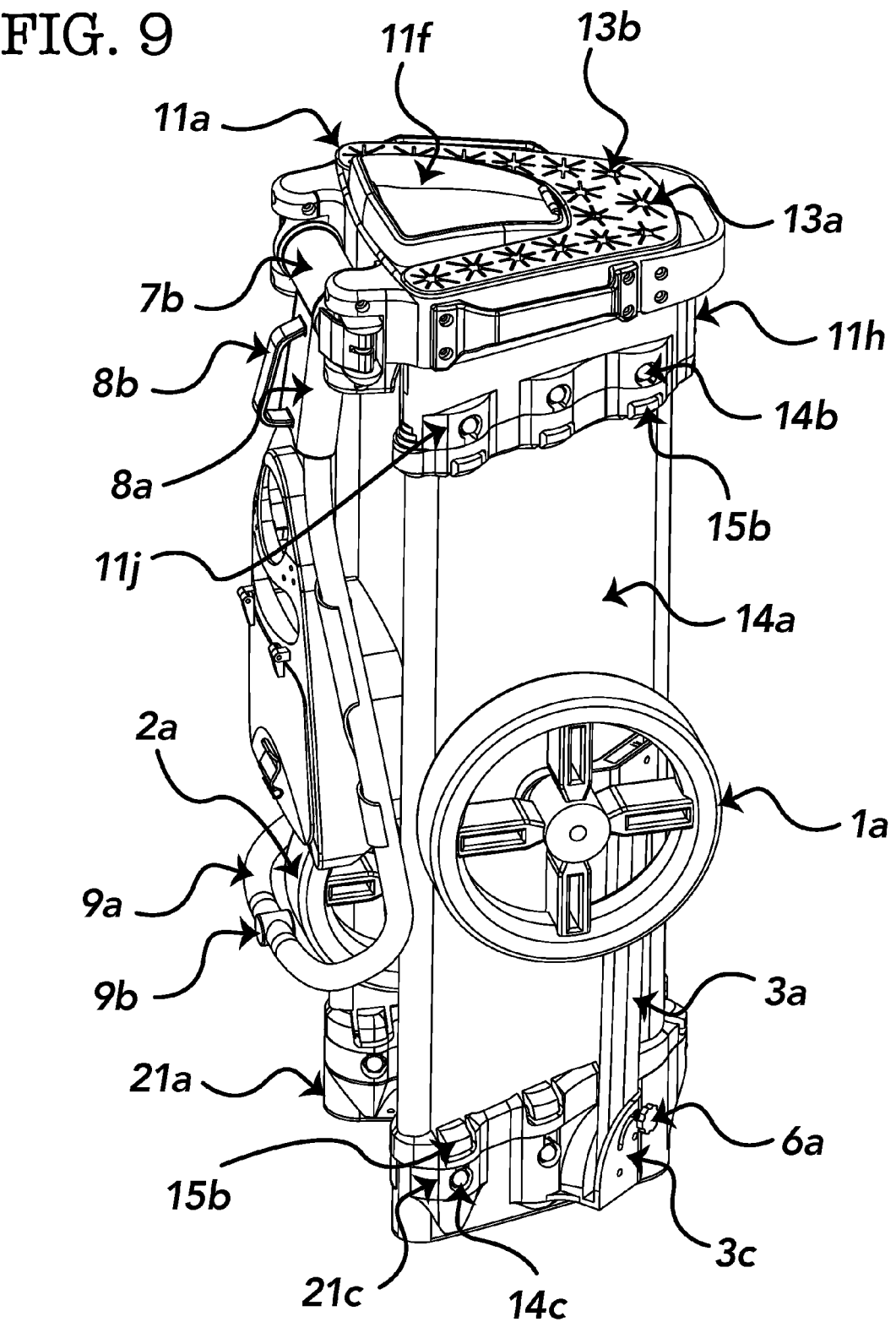
FIG. 9 shows a side perspective view of the cart in a folded position for storage and riding.
Figure 12:
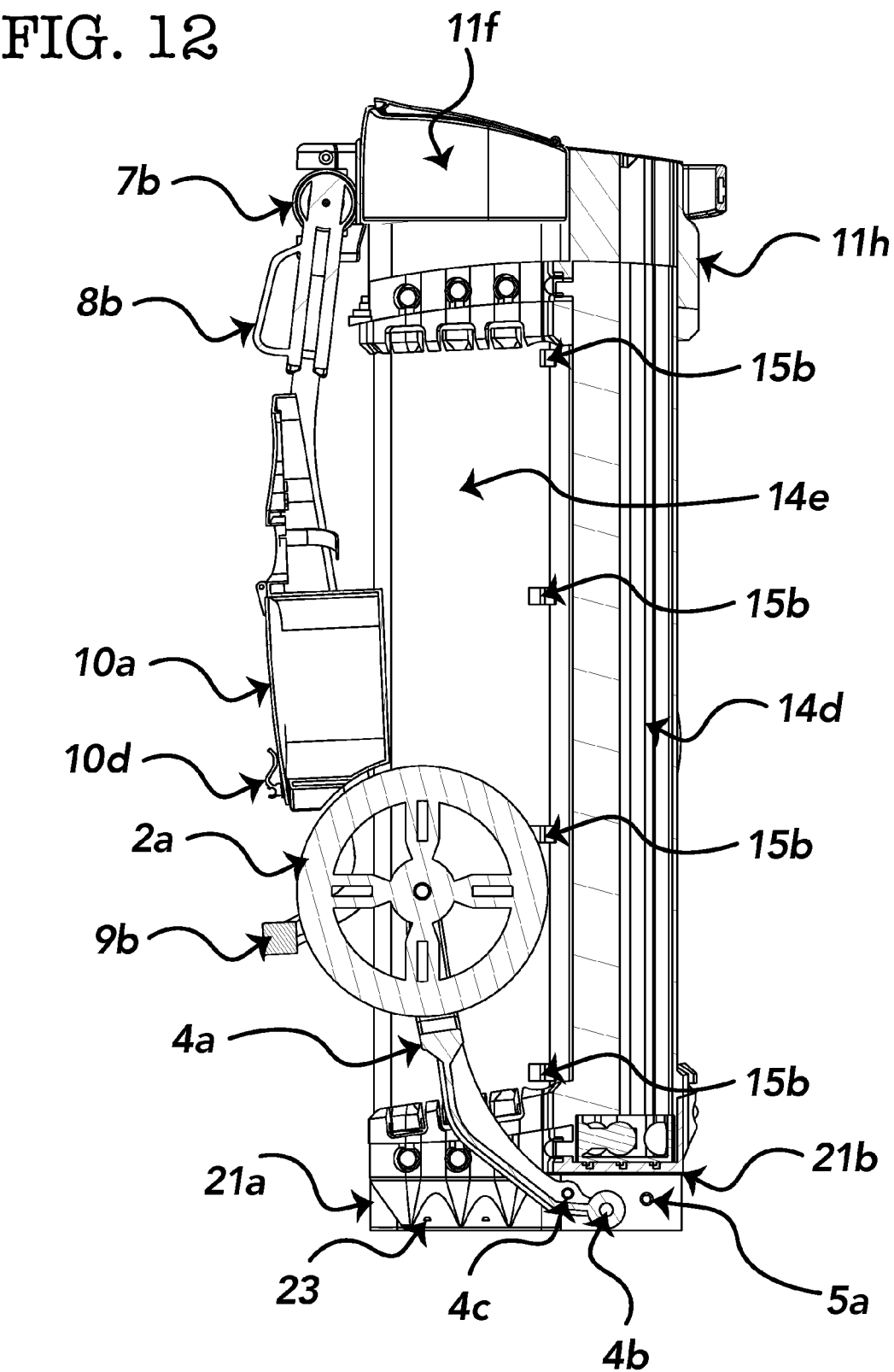
FIG. 12 shows a cross-sectional side view of the cart of FIG. 11.

These components will be thoroughly described in the proceedings. The specific details will be presented as evolving scope of work for carrying out the invention, not limitations:

1) WHEELS 1a and 2a as shown in FIGS. 3 and 9 are equipped with foam-filled, lightweight, and maintenance-free tires. The front wheel 2a is smaller in diameter than the two rear wheels 1a as seen in FIG. 3. The intent is for a more compact folding configuration, saving storage space. Since most of the cart's weight rests on the two larger rear wheels 1a, the front wheel 2a, even though smaller, does not compromise the performance of the cart in an extended walking position. Wheels 1a are attached to the cart through the use of the rear axles 1b, which in turn are connected to trailing arm axle mount 3b as shown in FIG. 3. The axle mounts 3b are then connected to the trailing arms 3a also shown in FIG. 3. To provide support for the two rear wheels, trailing arms 3a are then connected to the trailing arm lower chassis mount 3c in FIGS. 3 and 7. Trailing arm lower chassis mounts 3c are fixed to the lower chassis 21a in FIG. 13. The front wheel 2a in FIG. 3 is attached to the cart through the use of the front wheel axle 2b also seen in FIG. 3. The axle 2b is then attached to the front fork 4a in FIG. 3. The front fork 4a, which provides support for the front wheel, is attached to the body of the cart through the use of a front fork axle 4b shown in FIG. 12. The fork axle 4b in FIG. 12 is connected to the body of the cart at the bottom of the lower chassis 21a shown in FIG. 12. Each rear wheel 1a rotatably supported from the lower chassis 21a through the use of the trailing arms 3a shown in FIG. 18 which pivots relative to the lower chassis mount 3c. The wheels 1a and 2a are designed to remain parallel to each other at all times, including during positional transitions folded and extended. Thus, they rotate on the same axis, allowing the cart to roll in a straight line while it is in use during walking mode shown in FIG. 6.

Figure 5:
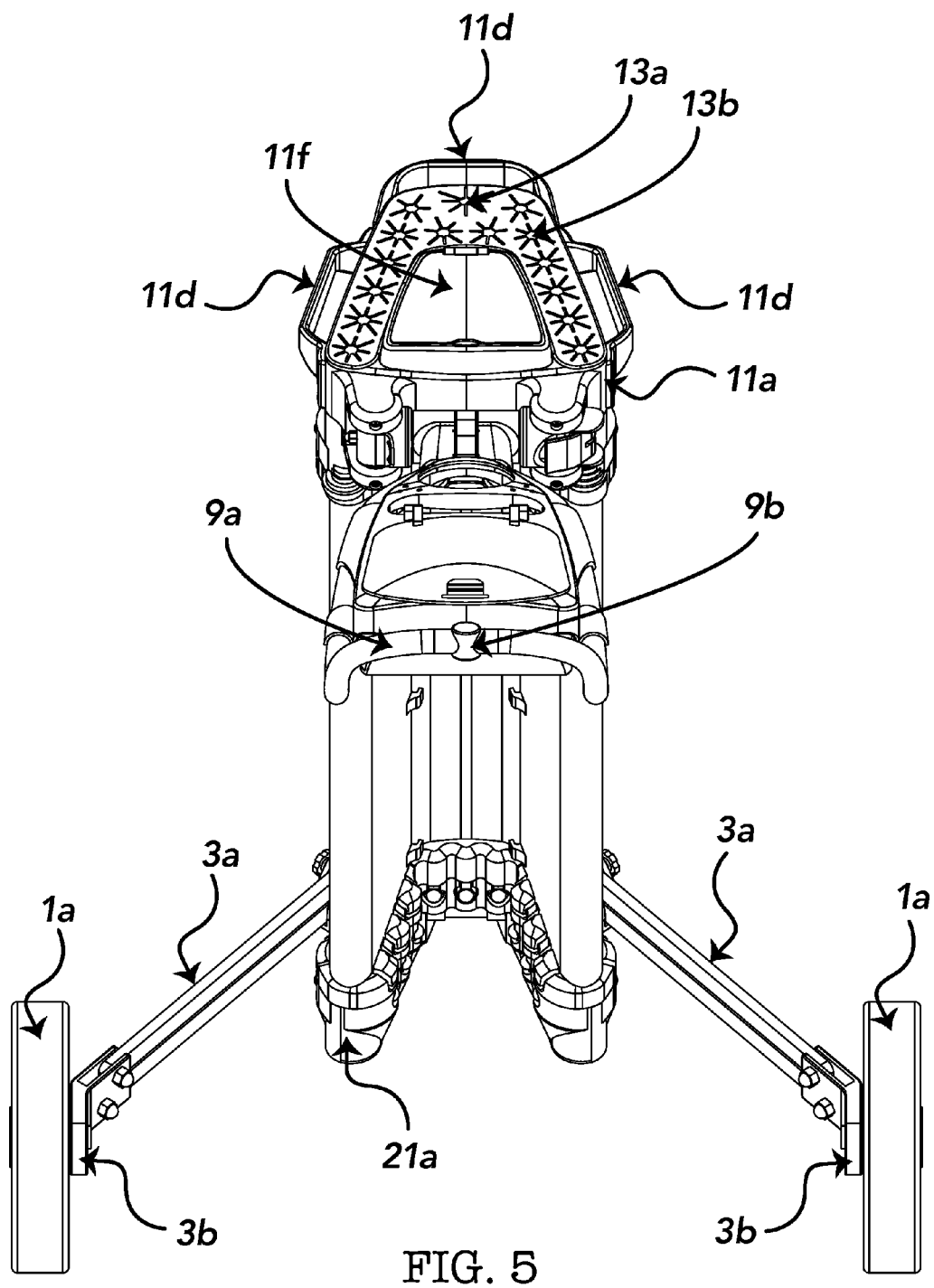
FIG. 5 shows a rear perspective view of the cart of FIG. 3.
Figure 6:
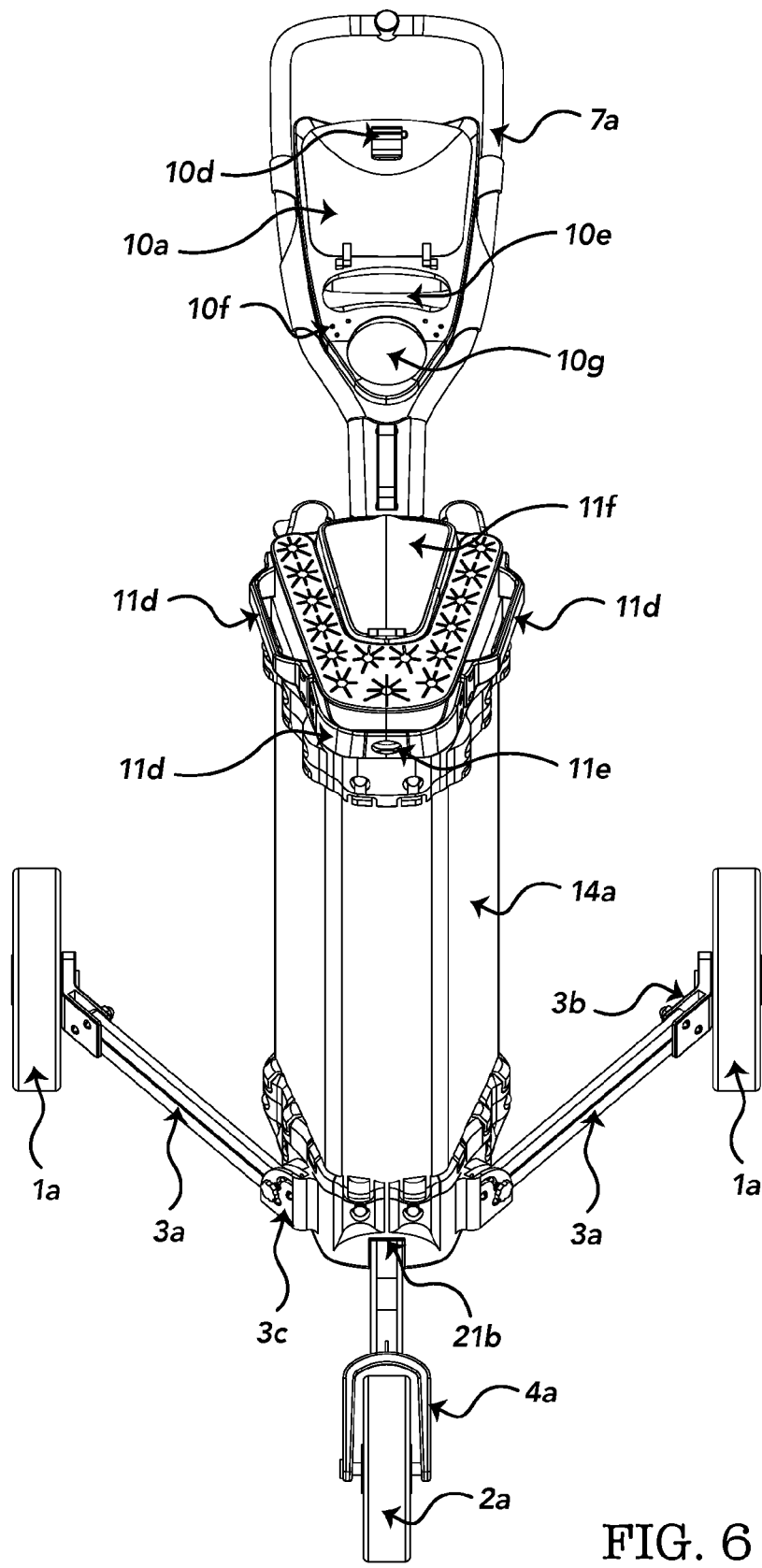
FIG. 6 shows a front perspective view of the cart of FIG. 4.

The three wheels 1a and 2a in FIG. 3 are rotatable and provide support for the cart above ground surface. The broad triangular distances between the three wheels when fully extended for walking as shown in FIGS. 5 and 6 provide a wide and stable base for the cart when moving above ground. This enables the cart to remain self-stabled while it is in the extended walking position. Therefore, it saves the golfer energy by not having to support or balance the cart during walking mode. This self-stability also allows the cart to run on its own, with forward momentum or, while rolling down the slopes on the golf course.

2) TRAILING ARMS 3a AND MOUNTS 3b as shown in FIG. 6 works in conjunction with the wheels 1a and 2a also shown in FIG. 6 to provide support for the cart above ground surface. In addition, they allow the cart to be transformed into two collapsible positions: folded (for storage and riding) and extended (for walking). Trailing arm lower chassis mount 3c in FIG. 18 is equipped with a locking mechanism including a lock pin 6a and lock pin spring 6c also shown in FIG. 18.

Figure 7:
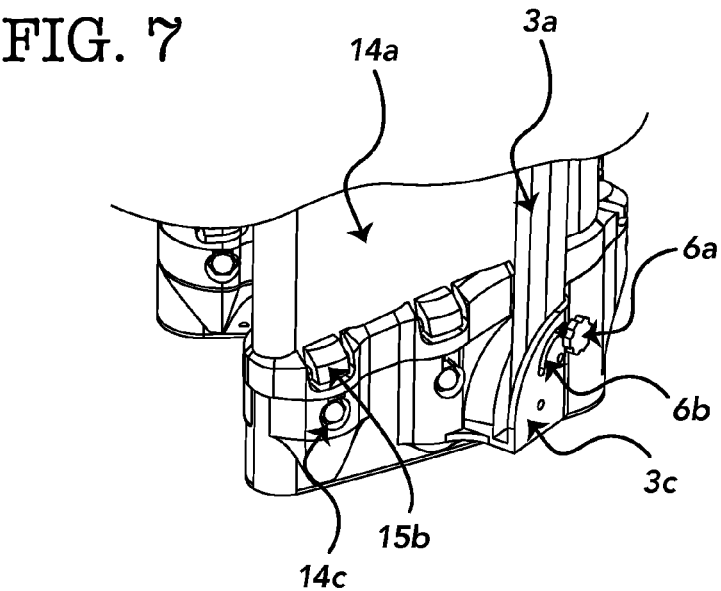
FIG. 7 shows a partial, enlarged side perspective view of the cart with the rear trailing arms in a folded storage position.
Figure 18:
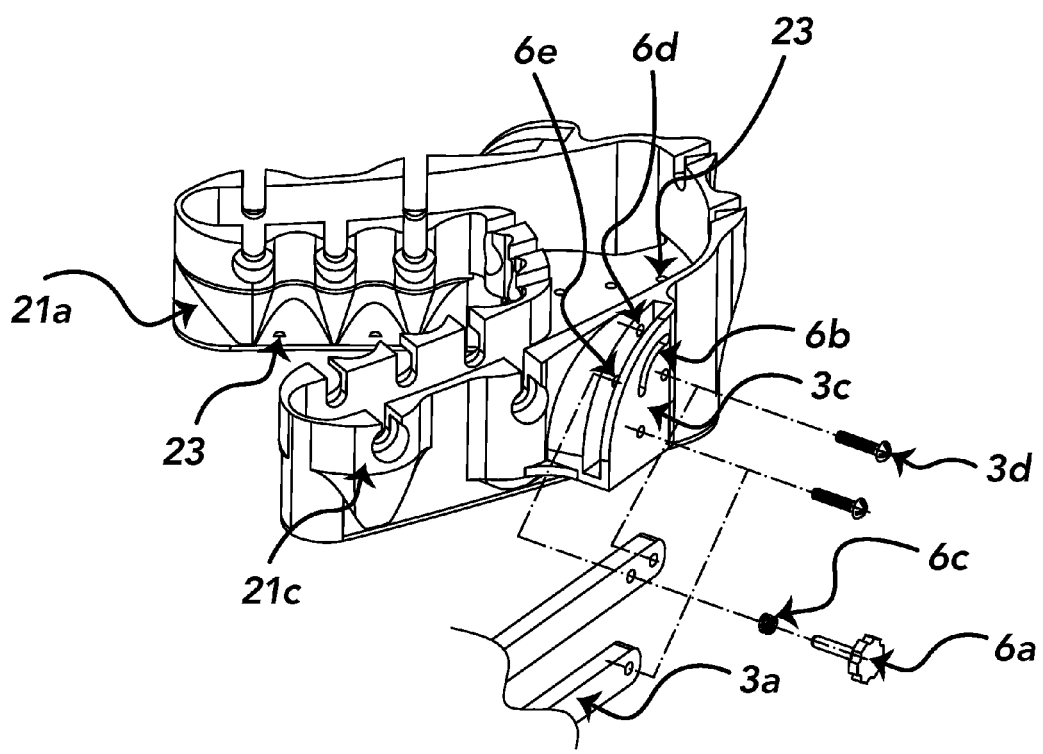
FIG. 18 shows an exploded side perspective of the lower chassis and related components.

Using the pin lock slots 6d and 6e in FIG. 18, the lock pin 6a will secure the trailing arms 3a into a folded position when it is engaged at the 6d lock slot shown in FIG. 7. The cart can be transformed into an extended position when lock pin 6a is engaged at the 6e lock slot shown in FIG. 8. During the two positional transitions: folded and extended, the trailing arms remain parallel as they pivot to move the two rear wheels 1a from storage position closer to each other and extended position further from each other.

Figure 8:
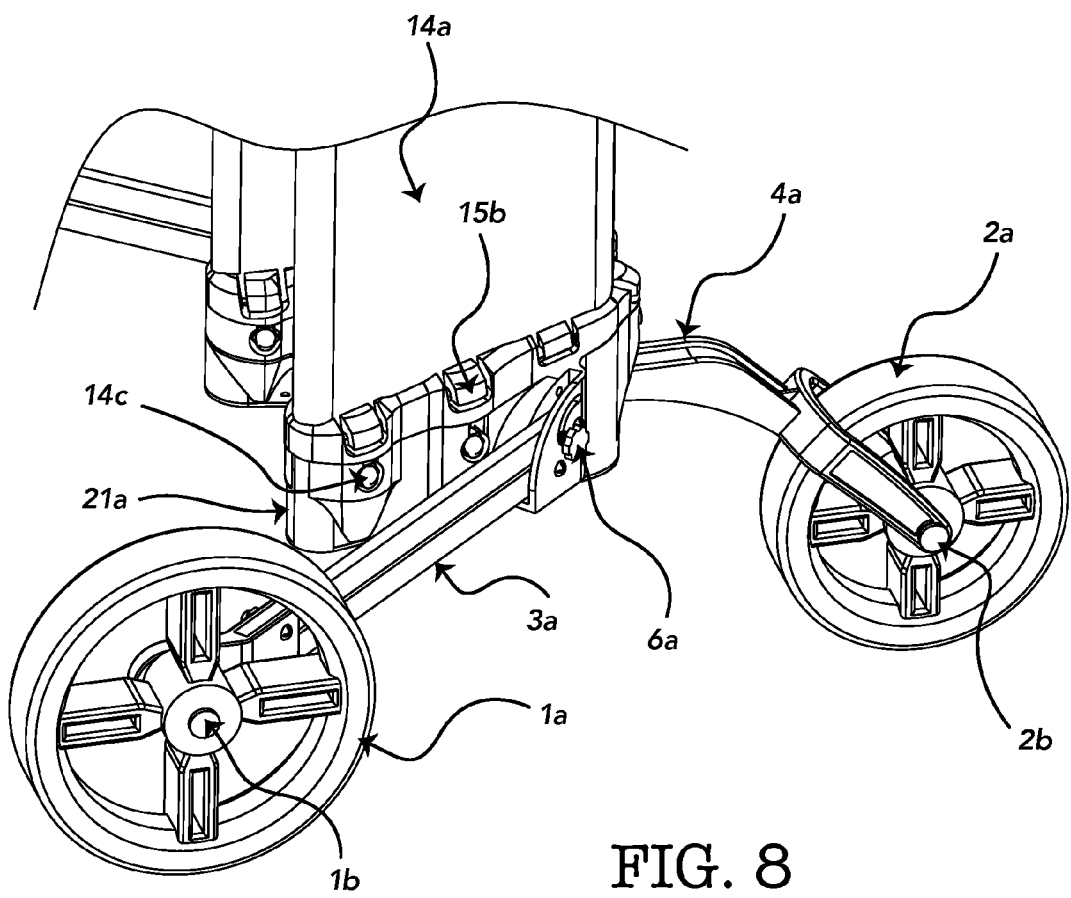
FIG. 8 shows a partial, enlarged side perspective view of the cart with the rear trailing arms in an extended walking position.

3) FRONT FORK 4a shown in FIGS. 1, 6, and 8. The rotatable front wheel 2a is installed to the front fork shown in FIG. 6 through the use of front wheel axle 2b in FIG. 3, supporting the remainder of the cart's weight not carried by the two rear wheels 1a. A fork axle 4b in FIG. 12 connects the front fork 4a to the body of the lower chassis 21a shown in FIG. 12. The front fork 4a and wheel 2a pivots between a folded storage position and extended walking position, by pivoting down under a lower portion of the cart and then up behind a rearward portion of the cart, into the center chassis cavity 14e shown in FIG. 12 when front wheel 2a is in folded storage position.

Figure 10:
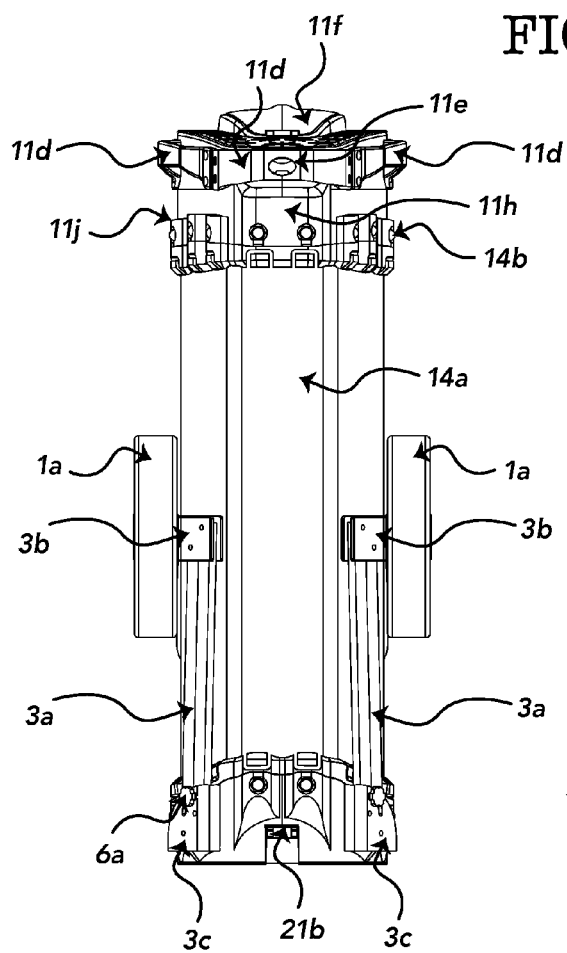
FIG. 10 shows a front view of the cart of FIG. 9.
Figure 13:
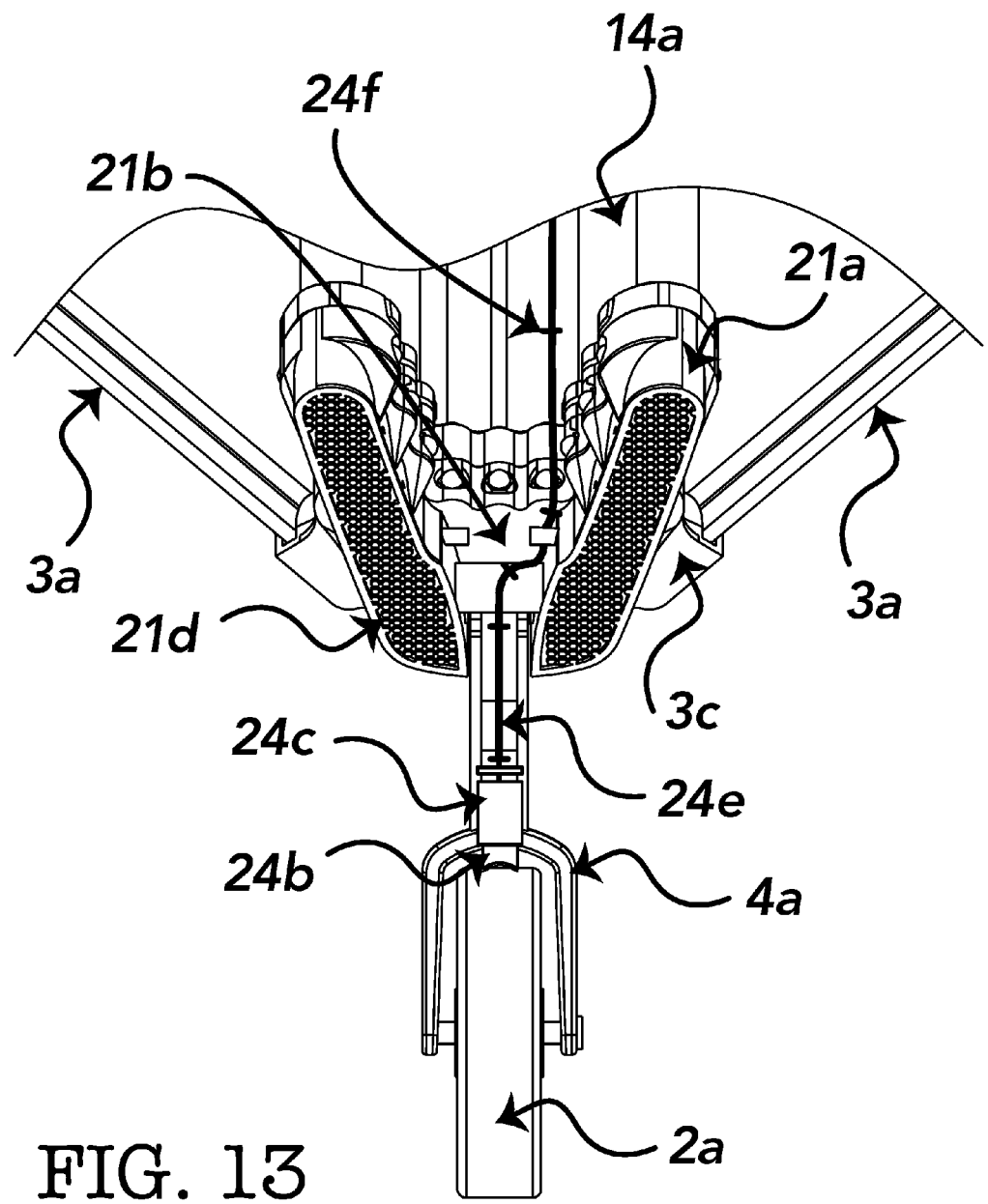
FIG. 13 shows a partial, enlarged bottom perspective view of the cart in an extended walking position (brake assembly shown)

The front fork 4a has two detent checks 4c, one on each side-wall of the front fork 4a shown in FIG. 12. Detent checks 4c are designed to capture the upper detents 5a and lower detents 5b shown in FIG. 14. Located in the lower chassis recessed panel 21b in FIGS. 12 and 13, detent checks 4c are designed to temporarily lock the front fork 4a in its intended folded or extended positions. At anytime, these two collapsible positions can be interchanged simply by manually pulling on the front wheel 2a and front fork 4a to disengage the detents 5a and 5b shown in FIG. 14 from the detent checks 4c. In the extended position shown in FIG. 6, the upper part of the front fork 4a will come to rest pressing against the lower chassis recessed panel 21b as shown in FIGS. 6, 10 and 13. The friction from the upper detent 5a pressing against detent checks 4c partially shown in FIG. 2, will temporarily lock the front fork 4a and the front wheel 2a in place when the front wheel 2a needs to be lifted above ground surface for steering or maneuvering during walking mode. In the folded position shown in FIG. 12, the friction from the lower detent 5b pressing against the detent check 4c will temporarily lock the front fork 4a and the front wheel 2a in their folded position.

Figure 4:
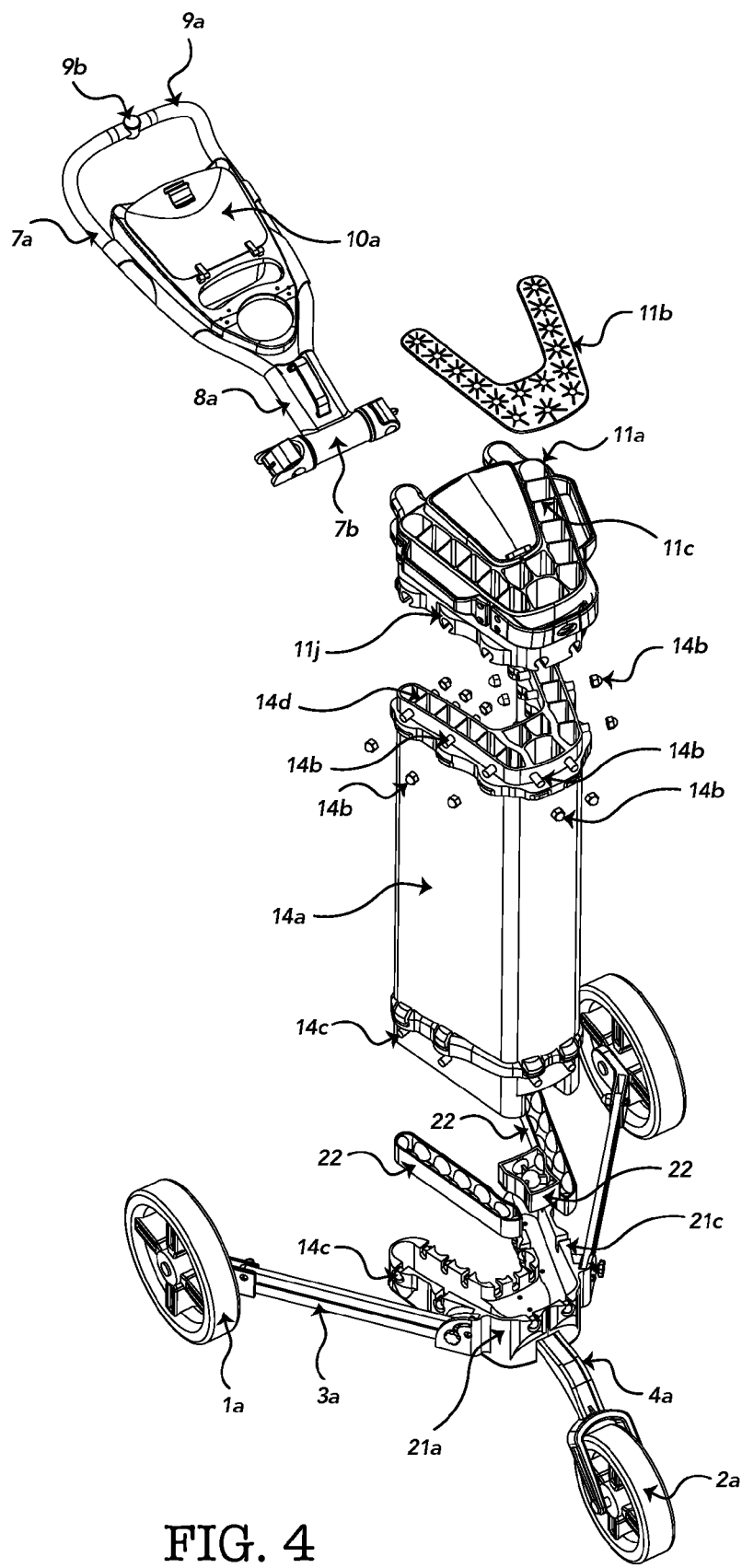
FIG. 4 shows an exploded side perspective view of the cart displaying its major components.

4) LOWER CHASSIS 21a shown in FIGS. 4, 5, and 13 has a V-shaped configuration. Lower chassis 21a has two trailing arm chassis mounts 3c shown in FIG. 6, each of the mount 3c is equipped with trailing arm lock pin 6a shown in FIG. 7. Lock pin 6a has locking mechanisms to set the trailing arms 3a into a folded shown in FIG. 9 or extended position shown in FIG. 6.

Lower chassis 21a also has a fork axle 4b for the installation of the front fork 4a best shown in FIG. 12. Multiple water drainage 23 are provided near the bottom of the lower chassis 21a base as shown in FIG. 18 to drain collected water from rain or washing of the cart.

Figure 2:
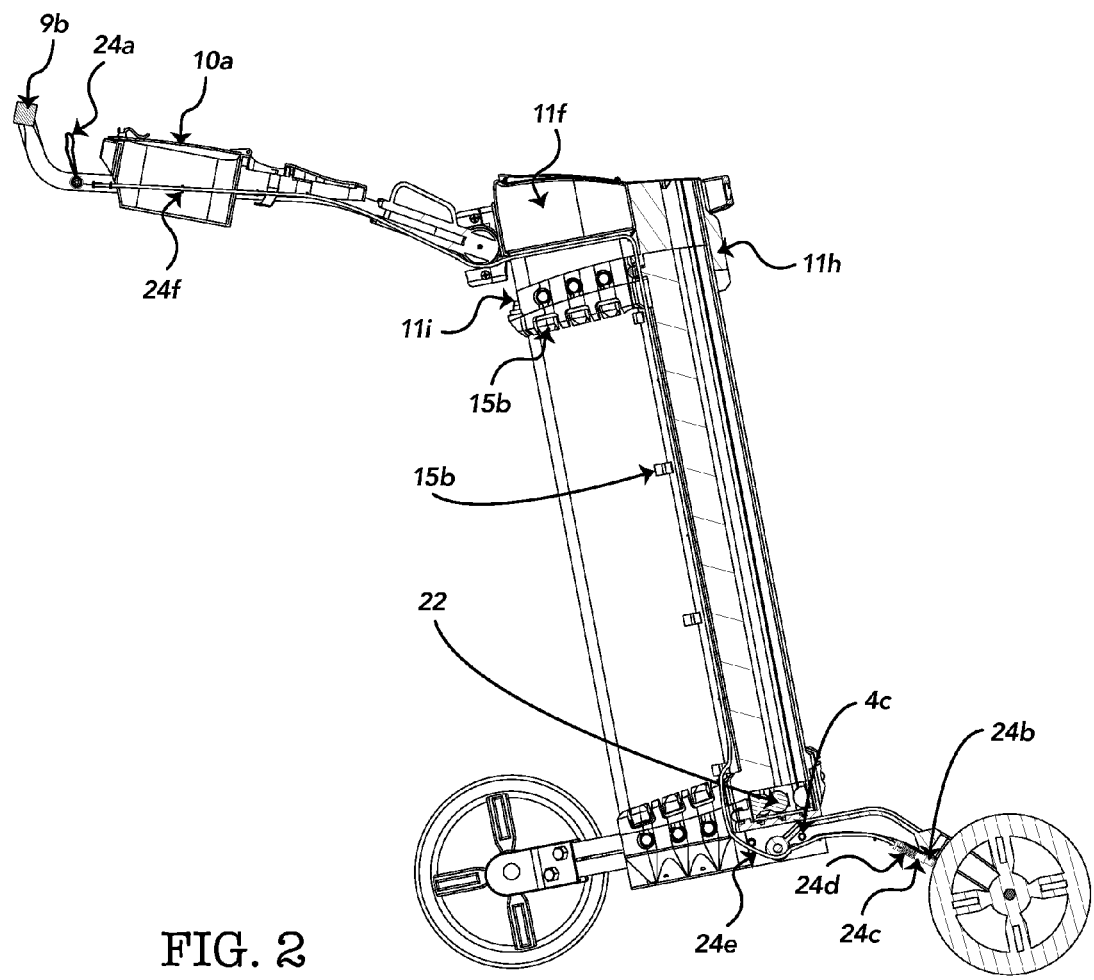
FIG. 2 shows a cross-sectional side view of the cart of FIG. 1 without the assembled accessories or golf clubs.

To protect the golf clubs during transportation, clubs anchorage system 22, which will likely be made of rubber, has been installed as shown in FIGS. 2 and 4. Clubs anchorage system 22, which consists of a network of rubber balls, has 15 club slots. Each club slot consist of at least two over hanging rubber balls. The club slots are positioned mirror image to the slots seen in center chassis 14a and upper chassis 11a, which can be best seen in FIG. 4. Also as shown in FIG. 4, clubs anchorage system 22 gets divided into three sets. Each set will be inserted into the cavity of lower chassis 21a shown in FIG. 4. When a golf club gets inserted into the cart, as it makes its way toward the bottom, the grip of the club will force its way through the over hanging set of rubber balls, the returning energy from the compressed rubber balls will apply friction up against the grip. This friction will help keep the club secure and prevent it from jostling in the cart. As a result, the golf clubs will stay quiet in the cart as it moves about the golf course or while being strapped onto a motorized riding cart.

The lower chassis base 21d has a recessed panel 21b shown in FIGS. 6, 10, 12, and 13. Recessed panel 21b allows room for the front fork 4a to pivot forward for transforming the cart into an extended position in FIG. 6 and to fold back tucking against the body of the center chassis 14a shown in FIG. 12.

Figure 14:
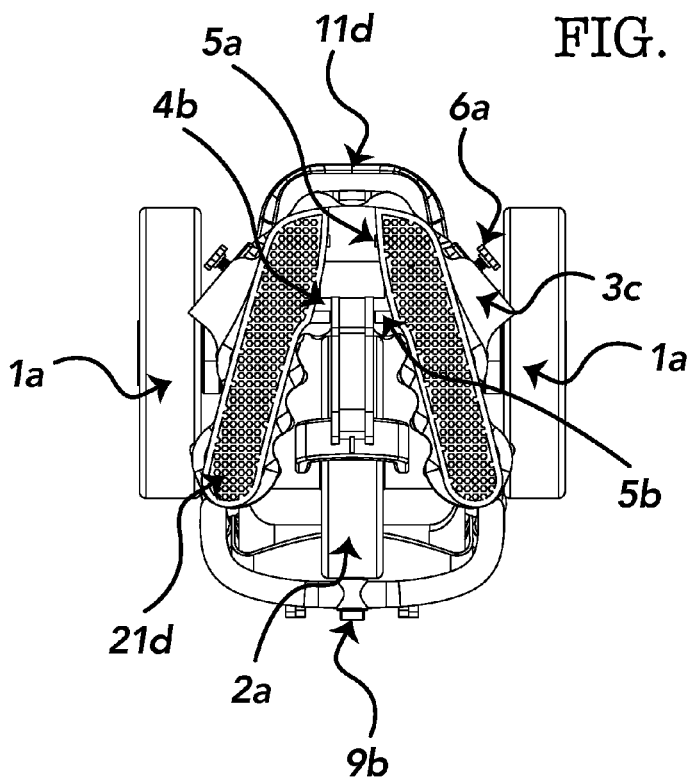
FIG. 14 shows a bottom view of the cart in a folded position for storage and riding.

Lower chassis 21a is also equipped with two sets of detents 5a and 5b for setting the front fork in folded or extended positions shown in FIG. 14. Lower chassis 21b has a V-shaped base, configured to be broad enough to allow the cart, in folded position, to be self-standing while accommodating the weight of a fully loaded cart. More significantly, V-shaped configuration is thoughtfully designed to be compact enough to fit on a standard stowing platform of a motorized riding cart. Bottom of the lower chassis base is finished with a patterned texture base 21d shown in FIG. 14 for aesthetic and ground traction. Lower chassis 21a is to be fastened to center chassis 14a, which are mirror images of each other as shown in FIG. 9. This connection is achieved through the use of a plurality of lower fasteners 14c and lower fastener brackets 21c also shown in FIG. 9. FIG. 8 shows a close-up view of the lower chassis 21a and center chassis 14a connected.

5) CENTER CHASSIS 14a shown in FIGS. 3, 4, 16, and 17 includes a plurality of body wrap hooks 15b shown in FIGS. 9, 12, 16, and 17. A body wrap 15a shown in FIG. 1 is to be attached to the center chassis 14a through the use of the available body wrap hooks 15b. Body wrap 15a is equipped with stretchable quick storage straps 15c for holding miscellaneous items such as a sand bottle shown in FIG. 1. After the body wrap 15a is securely fastened onto the cart, storage compartments 16 shown in FIG. 1 can be attached to the body wrap through the use of snap buttons or like materials. Center chassis 14a provide a majority of the storage space needed for housing a set of golf clubs 18 partially shown in FIG. 1.

To keep each golf club separated from each other for easy stowing and removal, center chassis 14a is equipped with a series of golf club dividers 14d for all club slots. The golf club dividers 14d extend along the entire vertical length of the center chassis body shown in FIGS. 12 and 17. Center chassis 14a has a center cavity 14e which is the open space located between the accessories tray 11f and folded front wheel 2a best shown in FIG. 12. Cavity 14e is intended for use of storage space, which will be further elaborated in the proceeding section under Storage Compartments.

Center chassis 14a functions as link, connecting to lower chassis 21a and upper chassis 11a shown in FIG. 9. This connection of the three chassis, which makes up the main body of the cart, is achieved through the use of a plurality of lower fasteners 14c, lower fastener brackets 21c, upper fasteners 14b, and upper fastener brackets 11j shown in FIG. 9.

Figure 15:
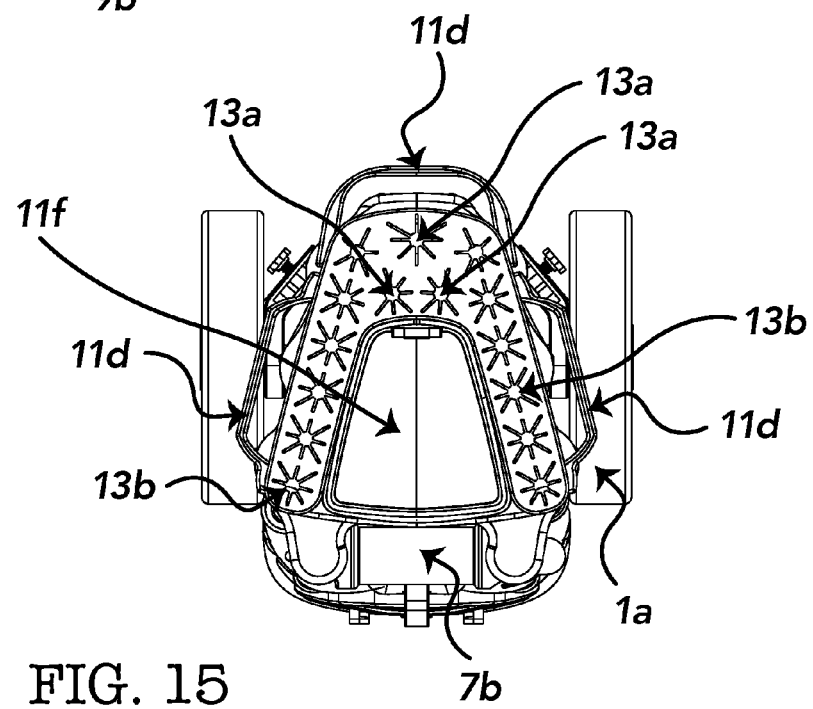
FIG. 15 shows a top view of the cart of FIG. 14 also in a folded position for storage and riding.
Figure 16:
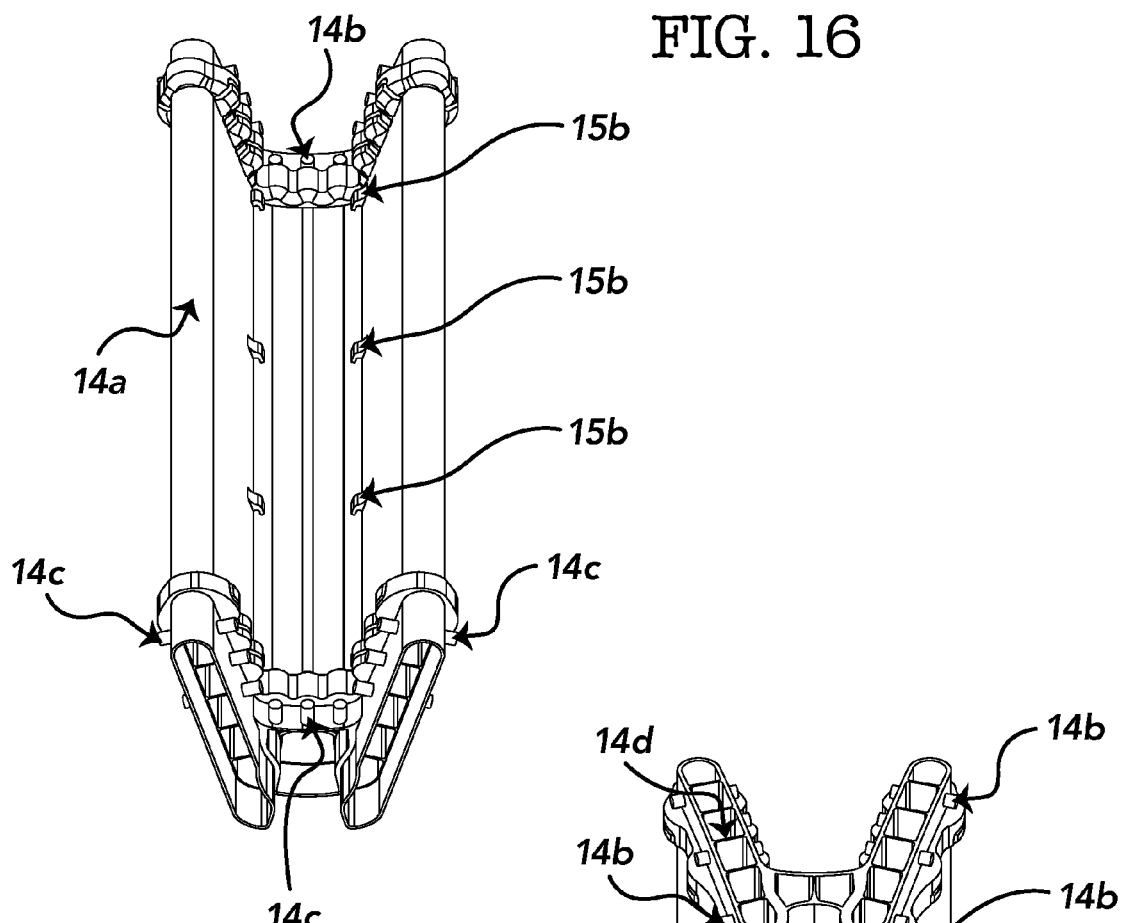
FIG. 16 shows a rear perspective view of the center chassis.
Figure 17:
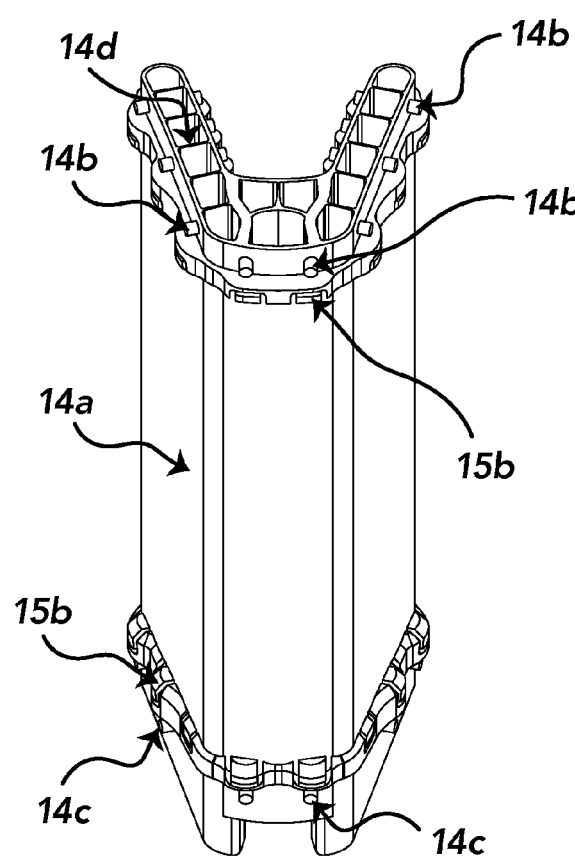
FIG. 17 shows a front perspective view of the center chassis.

6) UPPER CHASSIS 11a as shown in FIG. 4 has a club divider membrane 11b also shown in FIG. 4. Divider membrane has a total of 15 club slots that are defined by perimeter club slots 13b, which includes a left set and right set club slots, and center club slots 13a shown in FIG. 15. The perimeter club slots 13b spaced laterally from each other along a single left and right line to facilitate organization of clubs 18 partially shown in FIG. 1 with one club within each club slot, facilitating the clubs being arranged sequentially along line of club slots of perimeter slots 13b. One of the club slots in the center set of slots 13a has larger diameter, such that a putter with an oversized grip can be accommodated. Larger club slot can be seen in FIG. 15. The three center golf club slots 13a shown in FIG. 15 are strategically placed between the perimeter set of club slots 13b to provide convenient access to the three most frequently used golf clubs in an average round of golf: the putter and wedges. The wedge is a commonly use club which is also referred to as a lob, sand, or gap wedge. An average golfer carries a minimum of two wedges during a round of golf.

Most golfers, when missing their approach shot on to the putting green, they would use their wedges for these recovery shots. As for the putter, it is being used on practically every hole, unless the golfer aces the shot from a distance with the approach shot. As a result, the wedges and putter get used a lot and often together on the same hole. Therefore, the placement of these three clubs on the cart (isolating them from the other perimeter clubs) makes it easier for the golfer to identify and retrieve as needed.

All 15 club slots in the club divider membrane 11b are mirror images to all 15 club slots found in upper chassis 11a directly below shown in FIG. 4. Upper chassis is also equipped with upper golf club dividers 11c shown in FIGS. 4 and 19. Club dividers 11c works conjunction with the divider membrane 11b and center club dividers 14d to keep the golf clubs separated from each other, allowing each golf club to be stowed in its own designated club slot. Divider membrane 11b will likely be made of rubber or like materials. Divider membrane 11b shown in FIG. 4 has 15 club slots that are pre-cut star-shaped holes. The star-shaped holes are designed to allow room for the grip of a golf club to pass through, while the club shaft itself will be held by the smaller round-shaped cutout in the center of each star-shaped hole. This smaller round-shaped cutout is essentially the same size diameter of an average golf shaft. Keeping the golf club in the middle of each club slot is key to help prevent the golf club from leaning over to the side and making contact with its neighboring clubs, commonly referred to as chattering.

Figure 19:
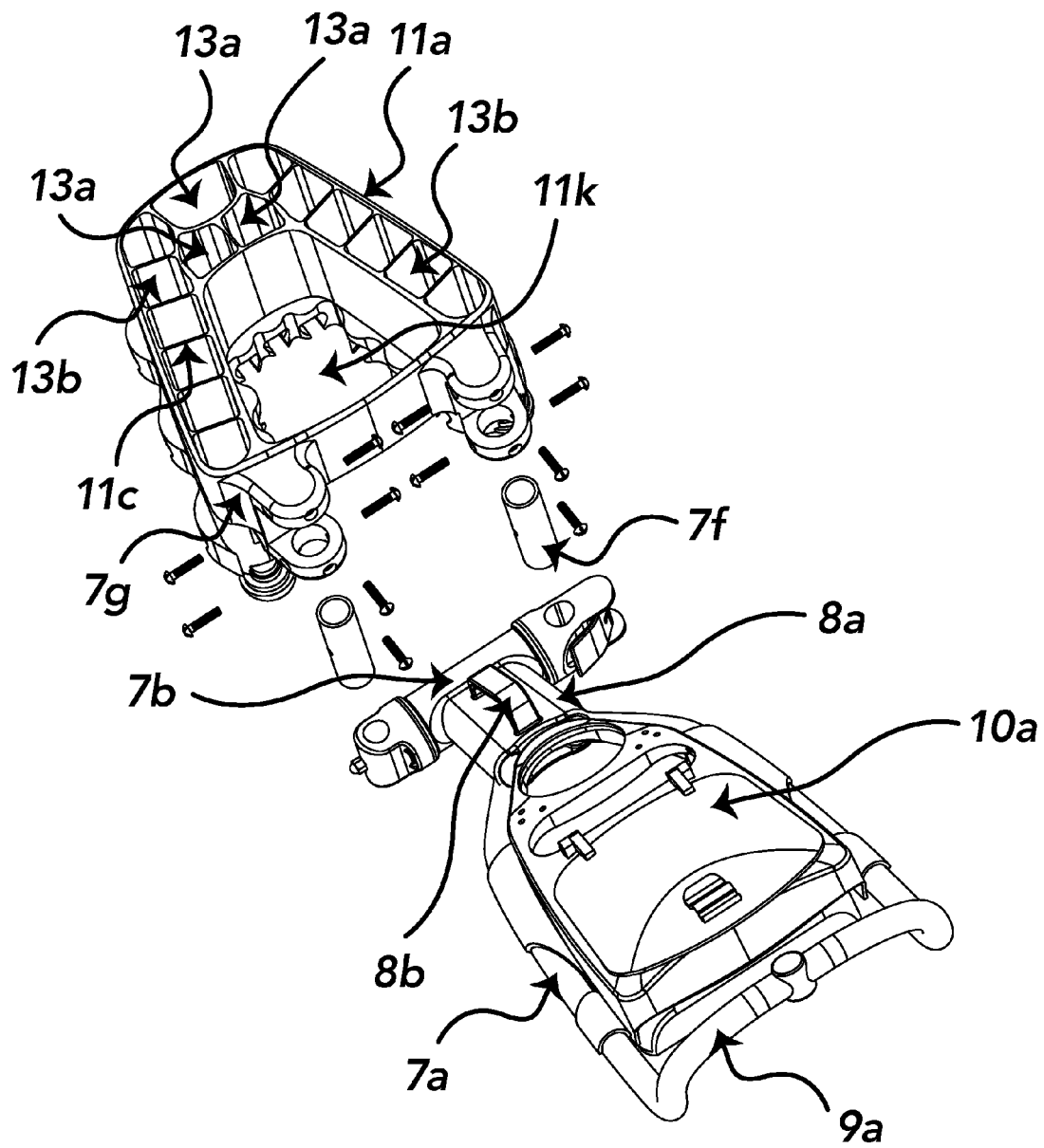
FIG. 19 shows an exploded side perspective view of the upper chassis and push bar assembly.

Upper chassis 11a has a center cavity 11k due to its V-shaped configuration. Center cavity 11k as seen in FIG. 19 will provide the space needed for the installation of an accessories tray 11f shown in FIGS. 9 and 12. Accessories tray 11f is designed to hold golfer's personal items such as wallet, keys, or electronic devices.

Upper chassis 11a includes three perimeter lift handles 11d shown in FIGS. 5 and 15 for lifting and handling of the cart. Lift handles 11d also provide protection for the golf clubs in case the cart falls over onto the ground.

Upper chassis 11a is also equipped with a riding cart bumper 11h shown in FIGS. 9, 10, and 12 to absorb rattling of the cart when moving upon a motorized riding cart. To further protect the cart against rattling, reinforced panels 11i shown in FIGS. 2 and 11 have been designed to help withstand the tension of the riding cart's strap and rattling of the cart when moving upon a motorized riding cart. These two reinforced panels 11i are equipped with a series small ledges designed to apply downward force to the cart as it is being held in place by the riding cart's strap.

Just above the reinforced panels 11i, clamp mount 7g shown in FIG. 19 is designed for the installation of the clamp pivot assembly 7b and push bar assembly 7a.

Upper chassis 11a is to be fastened to center chassis 14a through the use of upper fasteners 14d and upper fastener brackets 11j shown in FIG. 4.

The connection of these two chassis shown in FIG. 9 provides structural stability for the cart.

7) STORAGE COMPARTMENTS 16 can be seen in FIG. 1. Storage compartments 16 are add-on attachments and provide no structural stability to the cart. Each compartment has multiple pockets for stowing a golfer's miscellaneous items. These storage compartments are also commonly referred to as pockets (on a golf bag). They will likely be a soft sewn component and are made of stain-proof fabric.

There are a total of three main storage compartments attached to the cart. One is shown on the left side of the cart in FIG. 1. The second storage compartment (not shown) is on the opposite side of the cart in FIG. 1. The third main storage compartment (not shown) is located in the center chassis cavity 14e, an open space located between the folded front wheel 2a and accessories try 11f shown in FIG. 12. These three storage compartments are installed onto the cart through the use of a body wrap 15a shown in FIG. 1. Body wrap 15a is equipped with multiple quick storage straps 15c also shown in FIG. 1. Body wrap 15a is installed onto the cart through the use of a plurality of hooks 15b shown in FIGS. 9, 12, 16, and 17. The combined storage space provided by the above mentioned storage compartments along with the stretchable quick storage straps 15c will be used for stowing miscellaneous items such as clothing, gloves, hats, shoes, water bottles, and other golf-related items.

Since these storage compartments have no role in the structural stability for the cart, they are designed to be easily removable for cleaning. Different color and material options for the compartments will also be made available for customized personalization.

8) HAND BRAKE ASSEMBLY 24a-24f is shown in FIGS. 1, 2 and 13.

During a round of golf, a golfer will often need to park the cart to prevent it from rolling away. Thus a hand brake assembly 24a-24fg is provided. The hand assembly includes a brake lever 24a shown in FIG. 1 is conveniently located within arm's reach of the golfer. The brake pin 24b shown in FIGS. 2 and 13 works in conjunction with the brake spring 24d shown in FIG. 2. Brake pin 24b will release towards the front tire 2a applying pressure required to create friction between the brake pin 24b and front tire 2a. This added friction from brake pin 24b will help stop tire rotation. As shown in FIG. 2, the brake cable 24e engages the brake lever 24a and brake pin 24b allowing the two components to work simultaneously. As shown in FIGS. 2 and 13, the cable brackets 24f are strategically positioned, spaced apart from each other to secure the brake cable 24e against the cart's body. Further more, the cable brackets are designed to keep the cable tucked away, not interfering with the two main collapsible components: front fork and push bar assembly. The brake spring 24d is nestled inside the brake pin housing 24c as shown in FIG. 2. Also shown in FIG. 2, the brake spring 24d works in conjunction with the brake pin 24b, the brake cable 24e, and brake lever 24a to release and engage the brake pin 24b as needed for setting the cart in park.

9) PUSH BAR ASSEMBLY 7a-10g is shown in FIGS. 3, 6, 20, 21, and 22.

The push bar assembly 7a shown in FIG. 3 has two push bar handles 9a also shown in FIG. 3. The push bar handles 9a are designed for pushing and maneuvering the cart during walking mode. The push bar handles 9a can also be used as extra lifting leverage when it is in folded position shown in FIG. 9. When stowing, it is best to use the push bar handles 9a in conjunction with vertical lift handle 8b also shown in FIG. 9 for lifting and handling the folded cart.

As shown in FIG. 3, located at the center of the two push bar handles 9a, an umbrella holder mount 9b is designed for mounting an umbrella holder 20b shown in FIG. 1. An umbrella 20a in FIG. 1 can be inserted into the umbrella holder 20b to provide shade and shelter as needed when the cart is used in extended walking mode. The push bar assembly 7a also includes a caddy console 10a shown in FIGS. 2, 4, and 19. As seen in FIG. 6, caddy console 10a is equipped with multiple sub components such as caddy tray 10c, scorecard and pencil clip 10d, golf balls holder 10e, golf tee holders 10f, and a beverage holder 10g. These sub components together provide storage space for golfer's essential items such as golf range finder, scorecard, pencil, golf balls, tees, and beverage. As seen in FIG. 3, caddy tray 10c comes with a lid 10b and magnetic locks 12.

Figure 20:
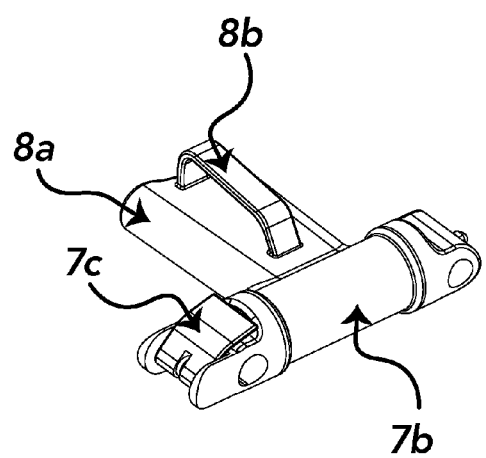
FIG. 20 shows a side perspective view of the push bar pivot assembly with a closed clamp rod lever.
Figure 21:
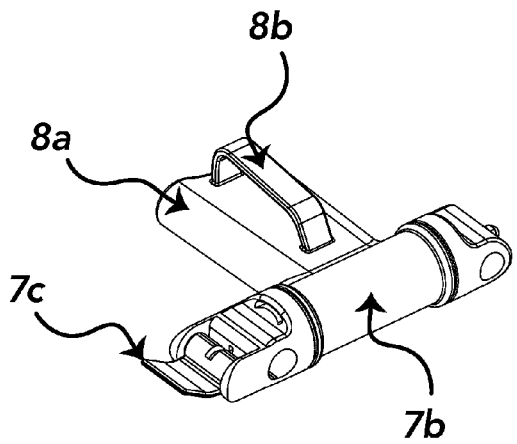
FIG. 21 shows a side perspective view of the push bar pivot assembly with an opened clamp rod lever.
Figure 22:
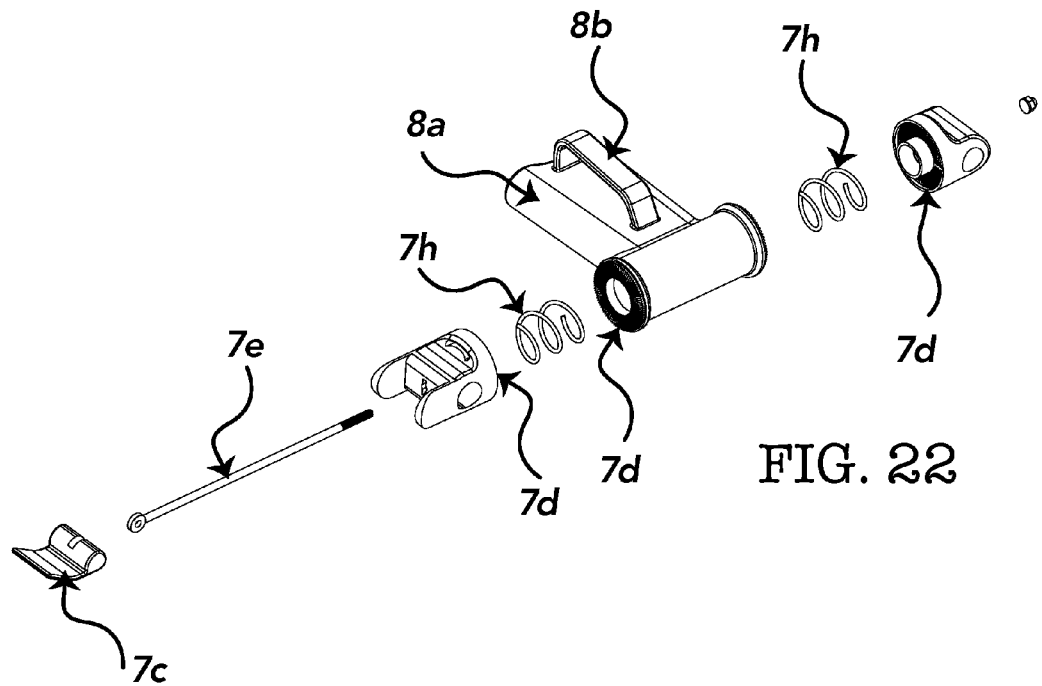
FIG. 22 shows an exploded side perspective view of the push bar pivot assembly and its accompanying components.

To achieve a better user experience, caddy console 10a is conveniently located within the golfer's reach when the cart is used in walking mode. The push bar assembly 7a also includes the clamp pivot assembly 7b shown in FIGS. 4, 19, 20, 21, and 22. The clamp pivot assembly 7b in FIG. 22 includes a clamp rod lever 7c, clamp tension rod 7e, clamp pivot locks 7d, clamp springs 7h, push bar mount 8a, and a vertical lift handle 8b. The clamp pivot assembly 7b works in conjunction with the push bar assembly 7a to allow the golfer the option to adjust the push bar handle 9a to different heights for ergonomic optimization. Height adjustments can be achieved through the use of the clamp rod lever 7c as shown in FIGS. 20 and 21. The push bar assembly 7a can be pivoted to the desired height while the clamp rod lever 7c is in the open position shown in FIG. 21. To set the push bar assembly 7a in fixed position, clamp rod lever 7c needs to be in a closed position shown in FIG. 20.

The above-mentioned push bar assembly 7a extends substantially, parallel to a long axis of the cart when it is in folded storage position shown in FIG. 9. Push bar handles 9a are positioned to be easily gripped for handling of cart when the push bar assembly 7a is in a folded storage position in FIG. 9.

Figure 11:
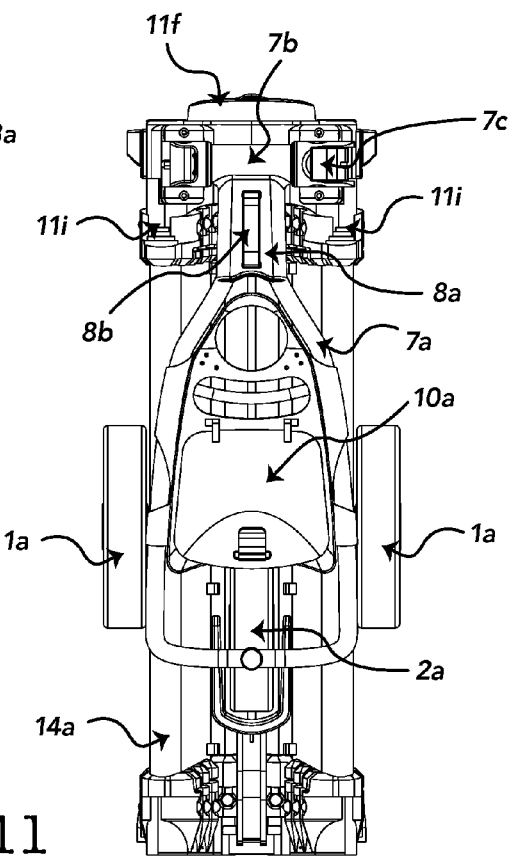
FIG. 11 shows a rear view of the cart of FIG. 10.

Push bar assembly 7a is designed to fold against the cart's vertical body in the most space saving configuration. Push bar handles 9a bend to contour the folded front wheel 2a shown in FIG. 9. Push bar assembly 7a is also intentionally designed to be narrower near the push bar mount 8a as shown in FIGS. 9 and 11. This narrow profile is intended to provide an open space, in which a golfer can reach to retrieve stowed items in center chassis cavity storage compartment 14e when the cart is in a folded position shown in FIG. 11.

The cart of FIG. 1 consists of different materials with some of the portions of the cart formed of lightweight materials to minimize overall weight of the cart and other portions of the cart formed of materials exhibiting higher rigidity and strength than other portions of the golf cart such that weight minimization and rigidity and strength of the cart is optimized by such multi-material construction.

Usage of the Cart and Implication of the Above-Mentioned Components:

Using the cart require the golfer to be able to lift about 25-30 lbs (although the cart itself is designed to be compact and lightweight, with the golf clubs and golf-related items added, it would require physical strength to handle).

To use the cart, assuming it is fully assembled and in a folded position, the golfer will insert up to 15 golf clubs into the club slots provide in 13a and 13b shown in FIG. 15. All irons and longer clubs such as a driver and fairway woods/hybrid clubs should be inserted into the perimeter golf club slots 13b. The putter and chipping wedges should be inserted into the three center golf club slots 13a for reasons previously explained. The putter will need to be inserted in the largest slot of the three as seen in FIG. 15. The next step is to load the golf-related items into the available storage compartments including the accessories tray and caddy console. From this folded position, the cart is ready to be used for riding on a motorized cart. The cart is to be strapped onto the motorized riding cart with the cart bumper 11h pressed against the body of the motorized riding cart. The cart strap is to be strapped over the cart's upper chassis, wrapping around the rear end of the upper chassis, gripping against the two strap reinforced panels 11i. From here, the cart strap can then be fastened, securing the folded cart onto the back of the motorized riding cart.

To transform the cart from a folded to extended walking position, the following steps should be followed:
1. With the cart placed on a spacious and flat surface, hold the perimeter lift handle 11d and tilt the cart 45 degrees to one side.
2. Using the opposite hand, disengage the trailing arm lock pin 6a from its folded position lock slot 6d shown in FIG. 18.
3. Grab the folded trailing arms 3a shown in FIG. 9 and pull them down until the lock pin 6a engages itself to the extended position lock slot 6e shown in FIG. 18.
4. Repeat steps 1 to 4 for the opposite side until the two trailing arms 3a and rear wheels 1a are fully extended as shown in FIG. 5.
5. Adjust the push bar assembly 7a to desired height for walking by flipping the clamp rod lever 7c to an open position shown in FIG. 21. Once desired height is achieved, flip the clamp rod lever 7c down to a closed position shown in FIG. 20. This action will cause the clamp tension rod 7e to tighten the clamp pivot locks 7d, securing the push bar assembly 7a in its desired position.
6. Lift the cart in its entirety above the ground using the perimeter lift handles 11d, using your preferred foot, kick the front wheel 2a downward to disengage the front fork 4a from the lower detent 5b. The front fork 4a and front wheel 2a will now suspend freely from the lower chassis 21a. Swing the front fork 4a and front wheel 2a forward as you lower the cart until the front fork 4a comes to rest at the lower chassis recessed panel 21b shown in FIGS. 6 and 13. The upper detent 5a will engage with the detent check 4c to temporarily lock the fork 4a in this extended position.

The cart is now fully extended and ready for walking mode. As shown in FIG. 1 an umbrella 20a can be installed to provide shading and shelter as needed through the use of an adjustable umbrella holder 20b also shown in FIG. 1. The base of the umbrella holder 20b has a short stud (not shown) that screws on to the umbrella holder mount 9b in FIG. 2.

As described in great details above, the cart is equipped with a brake assembly 24a-24f shown in FIGS. 1, 2, and 13. Brake is used for occasional parking when the cart is used in extended walking mode.

To transition the cart from the extended walking position into a folded position for storage after the round or to stow it on the back of a motorized riding cart, the following steps are to be followed:
1. Lift the cart in its entirety above the ground using the perimeter lift handles 11d,
2. Using your preferred foot, kick the front wheel 2a downward to disengage the front fork 4a from the upper detent 5a. The front fork 4a and front wheel 2a will now suspend freely from the lower chassis 21a. Swing the fork 4a and front wheel 2a rearward while lowering the cart until you can rest the cart on its lower chassis base 21d.
3. Grab the front wheel 2a and push it upward until it comes to rest against the wall of the center chassis cavity 14e as shown in FIG. 12. Lower detent 5b will engage with detent checks 4c to temporarily lock the front fork 4a and front wheel 2a in this folded position.
4. Collapse the push bar assembly 7a downward until it comes to a stop using the clamp rod lever 7c. (If installed, remove the umbrella 20a and its holder 20b shown in FIG. 1 for easier storage).
5. The last step is to set the two trailing arms 3a and rear wheels 1a into a folded position. First, tilt the cart slightly to one side until the rear wheel is off the round. Using the opposite hand disengage the trailing arm lock pin 6a from its extended position lock slot 6e shown in FIG. 18.
6. Grab the extended trailing arms 3a shown in FIG. 3 and push them upward until the lock pin 6a engages itself to the folded position pin lock slot 6d shown in FIG. 18.
7. Repeat steps 5 through 6 for the opposite side until the two trailing arms 3a and rear wheels 1a are set in a folded position shown in FIG. 9. At this folded position shown in FIG. 9, the cart can firmly stand on its own using the V-shaped base 21d shown in FIG. 14. Also shown in FIG. 14, the patterned texture lower chassis base 21d is designed to provide traction and rigidity for the folded cart while it is in standing position.

To reiterate, it is to be understood that the above-mentioned detailed descriptions of the preferred embodiments are presented as evolving scope of work for carrying out the invention. Future changes and modifications are expected to be made to further improve the objectives and advantages set forth by the present invention. The spirit and perceived nature of the invention will not be compromise.

What is claimed is:
1. An all-in-one golf cart, comprising:
at least three wheels, each of said at least three wheels rotatable and supporting the golf cart above a ground surface;
said at least three wheels movable between a folded storage position and an extended walking position, said at least three wheels located at a lowermost portion of the golf cart when in said extended walking position;

a push bar assembly collapsible between a folded storage position and an extended walking position;

a first plurality of golf club slots in a perimeter set and a second plurality of golf club slots in an interior set;

an upper chassis, center chassis, and lower chassis in a V-shaped configuration;

said center chassis extending between said upper chassis and said lower chassis, said center chassis fixed to said upper chassis and said lower chassis;

said at least three wheels including at least two rear wheels;

each of said at least two rear wheels rotatably supported from said lower chassis through at least one trailing arm which pivots relative to said lower chassis between said folded storage position and said extended walking position;

said at least two rear wheels supporting a weight of the cart when loaded and when said at least two rear wheels are extended into said extended walking position;

said at least three wheels including a third wheel located centrally between said at least two rear wheels and forward of said at least two rear wheels, said third wheel rotatably attached to said lower chassis, said third wheel supporting weight of the cart not carried by said at least two rear wheels;

a brake coupled to at least one of said at least three wheels;

said at least three wheels oriented to remain parallel with each other in both folded storage positions and extended walking positions for said at least three wheels;

said at least three wheels being fully extendable to said walking position wherein in said walking position said at least three wheels have a triangular form shape with distance between each of said at least three wheels to provide a base for the golf cart when moving; and said at least two rear wheels located further from each other when in said extended walking position than a height of said center chassis, providing stability for the cart.

2. The cart of claim 1 wherein each of said at least two rear wheels is coupled to said lower chassis through a set of at least two trailing arms which are pivotable to move each of said at least two rear wheels between said folded storage position and said extended walking position.

3. The cart of claim 1 wherein a locking mechanism is associated with said trailing arms coupling each of said at least two rear wheels to said lower chassis, to hold said at least two rear wheels in either said folded storage position or said extended walking position.

4. The cart of claim 1 wherein said at least one front wheel is rotatably supported by a pivotable front fork assembly, said front fork assembly pivoting between a folded storage position and an extended walking position for said at least one front wheel.

5. The cart of claim 1 wherein said push bar assembly includes a push bar handle thereon, said push bar assembly including a caddy console, said caddy console having a scorecard and pencil clip, a beverage holder, golf balls holder, golf tee holders, a lidded caddy tray, and an umbrella holder mount thereon; and said push bar assembly including a clamp pivot assembly to adjust said push bar handle to plural positions at different heights for ergonomic optimization.

6. An all-in-one golf cart, comprising:

at least three wheels, each of said at least three wheels rotatable and supporting the golf cart above a ground surface;

said at least three wheels movable between a folded storage position and an extended walking position, said at least three wheels located at a lowermost portion of the golf cart when in said extended walking position;

a push bar assembly collapsible between a folded storage position and an extended walking position;

a first plurality of golf club slots in a perimeter set and a second plurality of golf club slots in an interior set;

an upper chassis, center chassis, and lower chassis in a V-shaped configuration;

said center chassis extending between said upper chassis and said lower chassis, said center chassis fixed to said upper chassis and said lower chassis;

said at least three wheels including at least two rear wheels;

each of said at least two rear wheels rotatably supported from said lower chassis through at least one trailing arm which pivots relative to said lower chassis mount between said folded storage position and said extended walking position;

said at least two rear wheels supporting a weight of the cart when loaded and when said at least two rear wheels are extended into said walking position;

said at least three wheels including a third wheel located centrally between said at least two rear wheels and forward of said at least two rear wheels, said third wheel rotatably attached to said lower chassis, said third wheel supporting weight of the cart not carried by said at least two rear wheels;

said upper chassis and said lower chassis connected together at least partially through said center chassis with said upper chassis;

a brake coupled to at least one of said at least three wheels; and said lower chassis supporting said plurality of club slots in a single left side perimeter set of club slots and a single right side perimeter set of club slots, said left side perimeter set of club slots and said right side perimeter set of club slots defining opposite legs of a V-shaped configuration coupled to said lower chassis and said upper chassis.

7. The cart of claim 6 wherein said upper chassis includes at least one perimeter lift handle for lifting and handling the golf cart, said upper chassis having a plurality of fasteners;

said upper chassis including a riding cart bumper to at least partially absorb rattling of the golf cart when moving upon a motorized riding cart;

said upper chassis including at least one cart strap reinforced panel for withstanding tension of the riding cart's strap and rattling of the golf cart when moving upon a motorized riding cart;

said upper chassis having an accessories tray and said accessories tray having a lid;

said upper chassis also having a clamp mount for the installation of said push bar assembly;

said upper chassis including a said golf club divider membrane which keeps said golf clubs separated from each other to at least partially prevent club rattling and chattering; and said perimeter club slots spaced laterally from each other along a single left and right line to facilitate organization of clubs with one club within each club slot, wherein the clubs are arranged sequentially along said line of said club slots of said right side and left side perimeter slot sets.

8. An all-in-one golf cart, comprising:
at least three wheels, each of said at least three wheels rotatable and supporting the golf cart above a ground surface;
said at least three wheels movable between a folded storage position and an extended walking position, said at least three wheels located at a lowermost portion of the golf cart when in said extended walking position;
a push bar assembly collapsible between a folded storage position and an extended walking position;
a first plurality of golf club slots in a perimeter set and a second plurality of golf club slots in an interior set;
an upper chassis, center chassis, and lower chassis in a V-shaped configuration;
said center chassis extending between said upper chassis and said lower chassis, said center chassis fixed to said upper chassis and said lower chassis;
said at least three wheels including at least two rear wheels;
each of said at least two rear wheels rotatably supported from said lower chassis through at least one trailing arm which pivots relative to said lower chassis mount;
said at least two rear wheels supporting a weight of the cart when loaded and when said at least two rear wheels are extended into said extended walking position;
said at least three wheels including a third wheel located centrally between said at least two rear wheels and forward of said at least two rear wheels, said third wheel rotatably attached to said lower chassis, said third wheel supporting weight of the cart not carried by said at least two rear wheels;
said upper chassis and said lower chassis connected together at least partially through said center chassis with said upper chassis and said lower chassis being duplicates of each other;
a brake coupled to at least one of said at least three wheels; and
said center chassis providing structural support for said upper chassis above said lower chassis to provide structural stability for the cart.

9. The cart of claim 8 wherein said plurality of golf club slots includes at least fourteen club slots with at least six of said club slots provided within said left set and at least six of said club slots provided within said right set, each of said club slots sized to hold a single golf club.

10. The cart of claim 8 wherein said center chassis includes a plurality of body wrap hooks with at least one said storage compartment coupled to said body wrap;
said center chassis also having a fastener for attaching said center chassis to said upper chassis and said lower chassis;
said center chassis including a plurality of said golf club dividers to keep the golf clubs separated.

11. The cart of claim 8 wherein said lower chassis includes a plurality of fastener brackets;
said lower chassis having at least one water drainage hole near the bottom of said lower chassis base;
said lower chassis including a gold club anchorage system which keeps the clubs separated from each other to prevent the golf clubs from rattling;
said lower chassis also having a trailing arm mount with a locking mechanism to set said trailing arm into a said folded or said extended position; and
said lower chassis including an axle for the installation of a front fork.

12. The cart of claim 8 wherein a handbrake is removably placed against at least one of said wheels, said handbrake is movable between a first locked position resisting wheel rotation and a second unlocked position allowing wheel rotation.

13. The cart of claim 8 wherein at least two detachable storage compartments are removably coupled to said golf cart, each of said at least two detachable storage compartments including a plurality of pockets for golfer items.

14. The cart of claim 8 wherein said at least one front wheel pivots between said folded storage position and said extended walking position by pivoting down under a lower portion of the cart and up behind a rearward portion of the cart into a space between said at least two rear wheels when said front wheel is in said folded storage position.

15. The cart of claim 5 wherein said push bar assembly extends substantially parallel with an axis of said cart when in said folded storage position and is positioned to be gripped for handling of said golf cart when said push bar assembly is in said folded storage position.

16. The cart of claim 6 wherein said cart has a dimension when in said folded storage position to fit in a designated golf bag stowing slot of a motorized riding cart.

17. The cart of claim 6 wherein at least two of said plurality of club slots are between said left set of club slots and said right set of slots.

18. The cart of claim 17 wherein said at least two club slots of said middle set include at least one large diameter club slot, such that a putter with a large grip is accommodated.

19. The cart of claim 2 wherein said at least two trailing arms remain parallel when pivoted to move said at least two rear wheels from said folded storage position near each other and said extended walking position further apart.

* * * * *